US010467404B2

(12) United States Patent
Brumlow

(10) Patent No.: US 10,467,404 B2
(45) Date of Patent: *Nov. 5, 2019

(54) APPARATUS AND METHOD FOR SECURE MODULE BUILD

(71) Applicant: CONTINUUM MANAGED SERVICES HOLDCO, LLC, Boston, MA (US)

(72) Inventor: Michael Brumlow, Houston, TX (US)

(73) Assignee: CONTINUUM MANAGED SERVICES HOLDCO, LLC, Boston, MA (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/715,626

(22) Filed: Sep. 26, 2017

(65) Prior Publication Data

US 2019/0095611 A1    Mar. 28, 2019

(51) Int. Cl.
| | | |
|---|---|---|
| G06F 21/00 | (2013.01) | |
| H04L 29/06 | (2006.01) | |
| G06F 21/51 | (2013.01) | |
| G06F 21/52 | (2013.01) | |
| G06F 16/16 | (2019.01) | |

(52) U.S. Cl.
CPC ............ *G06F 21/51* (2013.01); *G06F 16/166* (2019.01); *G06F 21/52* (2013.01); *G06F 2221/033* (2013.01); *G06F 2221/2145* (2013.01)

(58) Field of Classification Search
CPC .......... G06F 21/57; G06F 21/552; G06F 8/60; G06F 8/63; G06F 21/51; G06F 16/166; G06F 21/52; G06F 2221/2145; G06F 2221/033; H04L 41/08; H04L 41/02
See application file for complete search history.

(56) References Cited

U.S. PATENT DOCUMENTS

| | | | |
|---|---|---|---|
| 9,311,480 B2 | 4/2016 | Teddy et al. | |
| 9,614,865 B2 | 4/2017 | Teddy et al. | |
| 9,667,648 B2 | 5/2017 | Teddy et al. | |
| 2006/0179484 A1* | 8/2006 | Scrimsher | G06F 21/568 726/23 |
| 2014/0109170 A1 | 4/2014 | Nemiroff et al. | |
| 2016/0315955 A1 | 10/2016 | Beatty et al. | |
| 2018/0307840 A1* | 10/2018 | David | H04L 63/20 |

* cited by examiner

*Primary Examiner* — Lisa C Lewis
(74) *Attorney, Agent, or Firm* — Richard K. Huffman

(57) ABSTRACT

An apparatus for securely building a module for a consumer computing system, including a coordination server and a build server. The coordination server receives configuration and makefile data associated with the consumer computing system, places the data in a queue, and provides the module to the consumer computing system. The build server corresponds to the configuration data. The build server receives the data from the queue, and builds the module based on commands within the makefile data, where the build server extracts whitelist commands from the makefile data within a public root of the build server, executes the whitelist commands within a secure root of the build server to generate named object files from proprietary source files, transfers the named object files to the public root, renames the object files into renamed object files according to the whitelist commands, and links the renamed object files to generate the module.

24 Claims, 5 Drawing Sheets

PRESENT DAY MODULE BUILD SYSTEM

APPARATUS AND METHOD FOR SECURE MODULE BUILD

CROSS-REFERENCE TO RELATED APPLICATIONS

This application is related to the following co-pending U.S. Patent Applications, each of which has a common assignee and common inventors.

| SER. NO. | FILING DATE | TITLE |
|---|---|---|
| 15/715,664 | Sep. 26, 2017 | SECURE MODULE BUILD CENTER |
| 15/715,685 | Sep. 26, 2017 | AUTOMATED AND SECURE MODULE BUILDING SYSTEM |

BACKGROUND OF THE INVENTION

Field of the Invention

This invention relates in general to the field of computing technology, and more particularly to apparatus and methods for protection of computing systems from malicious intrusion.

Description of the Related Art

Not a single day passes that the news lacks headlines about cybercrimes, and no one is immune. Computers are used individually, in virtually every type of business, at the institutional level, by municipalities, by governments, and more importantly computers are used to manage and control soldiers, weapons, aircraft, ships, satellites, and missiles. In a military context, even the term "cyber warfare" is ubiquitously employed.

As one skilled in the art will appreciate, countermeasures to cybercrime attempts abound, including virus protection programs, spam filters, phishing detectors, token and cookie control, intrusion detection tools, trusted computing systems, firewalls, encryption, operating system upgrades, backups, and access restrictions. And yet, every day the news reports another successful malicious attack along with the damage that was incurred.

The threat of damage and/or theft of property (e.g., customer data, proprietary software, etc.) increases exponentially when access to a victim's system is legitimately obtained by a culprit, such as when a malicious system is granted access to a server over the internet, ostensibly for a valid purpose, but rather than transmitting data to the server in fulfillment of that purpose, the malicious system sends malicious information (e.g., Trojan Horse, viruses, etc.) to the server that is designed to cause damage to the server, to steal proprietary information stored on the server, or both.

The present application is directed towards the above noted situation, and more specifically to a scenario where tens of thousands of computing systems may access a plurality of servers and provide those servers with configuration information unique to each of the computing system along with instructions that the servers require to build special purpose operating system add-ons. These add-ons are generated by the servers and sent back to the computing systems. When run as part of the computing systems' operating systems, the add-ons execute to control hardware or perform functions that are not provided for by the operating systems themselves. The add-ons are referred to in the Unix (and Unix-derived operating systems) community as "modules" or "drivers." The modules/drivers interface to an operating system kernel executing on the computing systems in a manner that is not otherwise provided for by normal kernel calls.

As one skilled in the art will additionally appreciate, to build a module for a specific computing system, configuration and module build instructions must be transferred to the servers. Part of the module build instructions comprise so-called makefile data ("headers"), which include instructions unique to the specific computing system to compile and link code for the module so that it will execute correctly when installed on the specific computing system. And the present inventors have observed that often times malicious, but valid, operating system commands are embedded in the makefile data, which would render damage to the servers, or which are configured to steal proprietary data.

Therefore, what is needed is a system for building a module that detects and precludes damage to assets within the system that are employed to build the module.

What is also needed is a technique that will preclude makefile command access within a module build center to proprietary data.

What is furthermore needed is an apparatus and method for employing consumer configuration and makefile commands within a module build center, but which protect hardware and software within the center from malicious command interjection.

What is moreover needed is a system for automatically obtaining module build information from consumer computing systems, transferring the information to a module build center, and building and distributing modules to the consumer computing systems, which additionally protects assets (hardware, data, and software) within the module build center from malicious commands embedded in the information.

SUMMARY OF THE INVENTION

The present invention, among other applications, is directed to solving the above-noted problems and addresses other problems, disadvantages, and limitations of the prior art. The present invention provides a superior technique for building modules/drivers in an environment that precludes malicious damage and/or theft. In one embodiment, an apparatus for securely building a module for a consumer computing system is provided. The apparatus includes a coordination server and a build server. The coordination server is configured to receive configuration and makefile data associated with the consumer computing system, and is configured to place the data in a queue, and is configured to provide the module to the consumer computing system. The build server is coupled to the coordination server and corresponds to the configuration data. The build server is configured to receive the data from the queue, and is configured to build the module based on commands within the makefile data, where the build server extracts whitelist commands from the makefile data within a public root of the build server, executes the whitelist commands within a secure root of the build server to generate named object files from proprietary source files, transfers the named object files to the public root, renames the object files into renamed object files according to the whitelist commands, and links the renamed object files to generate the module.

One aspect of the present invention contemplates an apparatus for securely building a module for a consumer computing system. The apparatus has a coordination server and a build server. The coordination server is configured to receive configuration and makefile data associated with the consumer computing system, and is configured to place the data in a queue, and is configured to provide the module to the consumer computing system. The build server is coupled to the coordination server and corresponds to the configuration data. The build server is configured to receive the data from the queue and is configured to build the module based on commands within the makefile data. The build server includes a secure root and a public root. The secure root is configured to execute whitelist commands to generate named object files from proprietary source files. The public root is configured to extract the whitelist commands from the makefile data, to transfer the whitelist commands to the secure root, to receive the named object files, to rename the object files into renamed object files according to the whitelist commands, and to links the renamed object files to generate the module.

Another aspect of the present invention comprehends a method for securely building a module for a consumer computing system. The method includes: via a coordination server, receiving configuration and makefile data associated with the consumer computing system, and placing the data in a queue, and returning the module to the consumer computing system; and via a build server, receiving the data from the queue, and building the module based on commands within the makefile data, the receiving comprising: extracting whitelist commands from the makefile data within a public root of the build server; executing the whitelist commands within a secure root of the build server to generate named object files from proprietary source files; transferring the named object files to the public root; renaming the object files into renamed object files according to the whitelist commands; and linking the renamed object files to generate the module.

BRIEF DESCRIPTION OF THE DRAWINGS

These and other objects, features, and advantages of the present invention will become better understood with regard to the following description, and accompanying drawings where.

DETAILED DESCRIPTION

Figure 1:
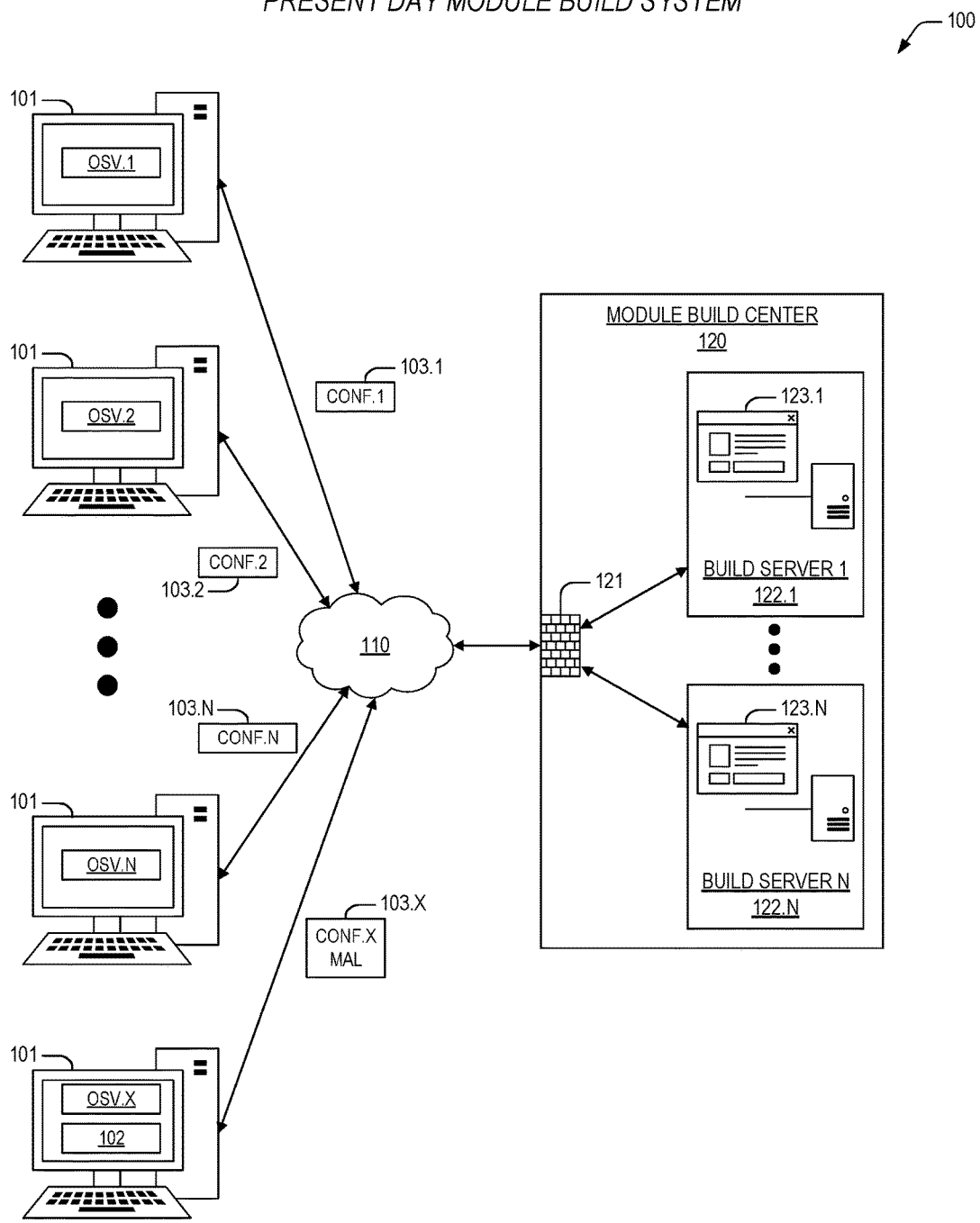
FIG. 1 is a block diagram illustrating a present day module build system.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

Definitions

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application" or "application") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

Kernel: The essential center of a computer operating system, the core that provides basic services for all other parts of the operating system. A kernel may include an interrupt handler that handles all requests or completed I/O operations that compete for the kernel's services, a scheduler that determines which programs share the kernel's processing time in what order, and a supervisor that permits use of the computer to each process when it is scheduled. A kernel may also include a manager of the operating system's address spaces in memory or storage, sharing these among all components and other users of the kernel's services. A kernel's services are requested by other parts of the operating system or by application programs through a specified set of program interfaces sometimes known as system calls.

Shell: The interactive user interface with an operating system. The shell is the layer of programming that understands and executes the commands a user enters.

Shim: A small library that transparently intercepts Application Programming Interface (API) calls to a kernel and changes the arguments passed, handles the operation itself, or redirects the operation elsewhere.

Wrapper: A facade software function that appears to execute an architecturally defined software function, while performing additional functions. The wrapper is a facade. A wrapper enables the additional functions to be performed while giving the appearance to a calling function that the architecturally defined software function was performed Module: A portion of a kernel that is loaded at run time. Modules interface with and control hardware devices such as graphics controllers and disk drives. A module is substantially similar to a device driver and is typically loaded at run time.

Makefile: A makefile is a special file containing commands that direct the make utility program (or similar program under operating systems other than Unix derivatives) to properly compile and link program modules.

In view of the above background discussion on computing technologies and associated techniques employed within present day systems for protection of computing system information, and particularly for protection of proprietary computer source code, a discussion of the disadvantages and limitations of present day systems will be presented with reference to FIG. 1. Following this, a discussion of the present invention will be presented with reference to FIGS. 2-5. The present invention provides a superior technique for automated build of modules which precludes tampering and theft of proprietary module build hardware and software.

Turning to FIG. 1, a block diagram is presented illustrating a present day module build system 100. The system 100 may include one or more consumer computing systems 101 that are coupled to a module build center 120 via one or more networks 110. The consumer computing systems 101 may each comprise one or more laptop computers, desktop computers, rack-mounted computers, tablet computers, smartphones, special purpose computers, embedded central processing units (CPUs), etc., or a combination of the noted types. The one or more networks 110 may comprise hardwired networks, wireless networks, or a combination of wired and wireless networks that employ any or a combination of well-known network transactional protocols, such as are presently employed to affect transfer of data over the well-known internet.

The module build center 120 may be collocated with other processing resources, such as a data center housing multiple servers for a variety of different clients. The module build center 120 may comprise a firewall 121 that is coupled to a plurality of build servers 122.1-122.N. The plurality of module build servers 122.1-122.N may each comprise a module build application program 123.1-123.N.

For purposes of the present application, the module build center 120 is configured to generate and distribute one or more modules to each of the consumer computing systems 101. As one skilled in the art will, modules are employed to perform special functions, typically hardware interface functions, in any of a number of operating system environments including, but not limited to, Unix derivatives (e.g., Linux, Solaris, Free BSD, Mac OS, Ubuntu) or any other operating system that employs the module concept.

From a module vendor's perspective, security of the module build center 120 is of utmost importance. As one skilled in the art will appreciate, damage to the center 120 may be incurred via the one or more networks 110 in myriad ways including, but not limited to, insertion of malware (e.g., Trojan Horses, viruses), insertion of spyware, phishing, tampering with normal operation, and hacking for purposes of damage or theft. Accordingly, a typical module build center 120 may comprise a firewall 121 to prevent unauthorized access to the build servers 122.1-122.N via the one or more networks 110. Consequently, all transactions entering or leaving the module build center 120 pass through the firewall 121, which examines each message and blocks those that do not meet specified security criteria.

However, as one skilled in the art will also appreciate, a firewall 121 may be overcome via many different mechanisms and, for purposes of the present application, the reader may assume that one or more of the consumer computing systems 101 are configured to surreptitiously overcome the firewall 121.

By way of example, as shown in the diagram of FIG. 1, each of the consumer computing systems 101 may comprise an operating system OSV.1-OSV.N, OS.X that employs the module concept, as is discussed above. The operating systems OSV.1-OSV.N, OS.X may differ only in respect to version (e.g., Linux Version X.X versus Linux Version Y.Y, etc.) and/or they may differ with respect to type (e.g., Linux versus Solaris, etc.). Similarly, each of the consumer computing systems 101 may also differ with respect to configuration (e.g., hardware and software installed). For purposes of clearly teaching the present invention, assume that the consumer computing system 101 running operating system OS.X additionally comprises application program 102, which is configured to overcome (i.e., punch through) the firewall 121 and tamper with one or more of the build servers 122.1-122.N to incur damage to the one or more build servers 122.1-122.N, to obtain proprietary software, or both.

As one skilled in the art will additionally appreciate, to build a module that is compatible with a given consumer computing system 101, the module build center 120 must have access to both configuration data (e.g., operating system type and version, kernel configuration and modifications, compiler type and configuration, compiler flags, compiler optimizations, etc.) and makefile data (e.g., headers, arguments passed for compiler and linker calls, etc.) corresponding to the given consumer computing system 101. Accordingly, in operation, configuration data and makefile data for each of the consumer computing systems 101 may be transmitted separately to the module build center 120, or the configuration data and makefile data may be consolidated into single configuration files 103.1-103.N, 103.X for transmission over the one or more networks 110 to the module build center 120. As the configuration files 103.1-103.N, 103.X pass through the firewall 121, they are each distributed to a corresponding one of the plurality of build servers 122.1 which comprises a module build application program 123.1-123.N that is compatible with the received configuration data, namely, a module build application 123.1-123.N having a compiler and linker of specific type and version that will build a module to correctly execute on the consumer computing system 101 associated with the received configuration data.

Consider however, for purposes of this disclosure, that configuration file 103.X also includes valid operating system commands in the makefile data that are not generally employed to build a module, but rather are malicious commands directed towards damage to its corresponding build server 122.1-122.N and/or theft of software (e.g., source code) stored thereon. In a typical configuration, such as is depicted in the diagram, the configuration files 103.1-103.N, 103.X are received over the one or more networks 110 by the firewall 121, and are subsequently distributed to corresponding ones of the plurality of module build servers 122.1-122.N, as is discussed above. For each of non-malicious configuration files 103.1-103.N, their corresponding module build servers 122.1-122.N may employ operating system commands within their makefile data to compile and link modules that will correctly execute on their corresponding consumer computing systems 101.

However, for malicious configuration file 103.X, its corresponding module build server 122.1-122.N may employ operating system commands within its makefile data to attempt to compile and link a module, and since the malicious configuration file 103.X includes malicious, but valid, operating system commands, the corresponding module build server 122.1-122.N may execute the commands to its detriment resulting in any of a vast number of maladies including, but not limited to, theft of proprietary data and/or source code (particularly proprietary source code employed by the corresponding module build server 122.1-122.N to build the module itself), deletion of some or all data on storage media, disruption of all processing in the module build center 120, etc. This is clearly a problem, and one which one reads about daily in the news, because limitations of this sort span the spectrum of institutions all the way from personal computing systems, through those employed by business and academia, up to those of state and national governments. No one is exempt.

The present invention overcomes the above noted problems, disadvantages, and limitations, and others, by providing a technique for securing proprietary assets in a module build center that is far superior to that which has heretofore been provided. The present invention will now be discussed with reference to FIGS. 2-5.

Figure 2:
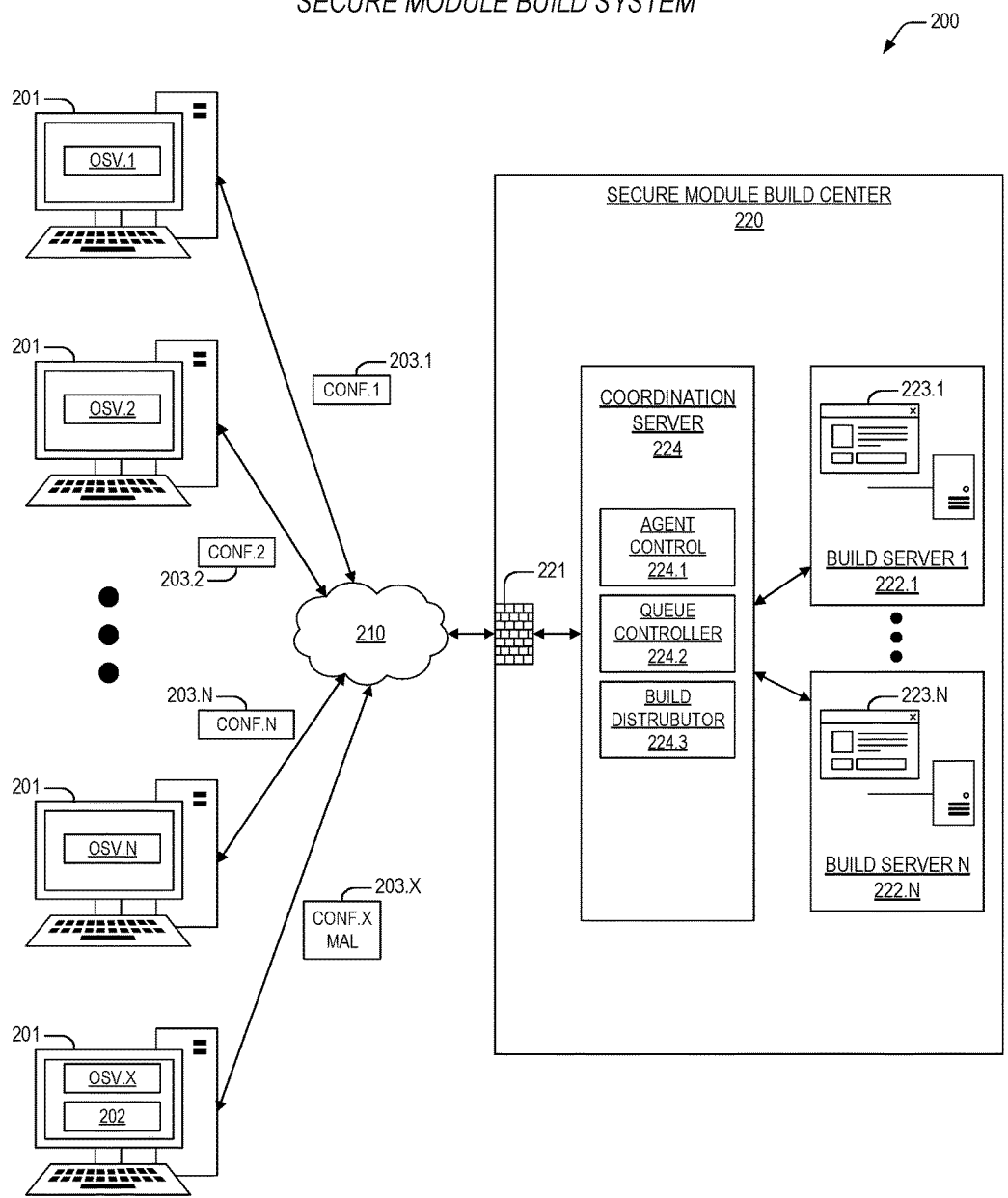
FIG. 2 is a block diagram depicting a secure module build system according to the present invention.

Turning to FIG. 2, a block diagram is presented depicting a secure module build system 200 according to the present invention. Like the system 100 of FIG. 1, the system 200 according to the present invention may include one or more consumer computing systems 201. Yet, these consumer computing systems 201 are coupled to a secure module build center 220 via one or more networks 210. The consumer computing systems 201 may each comprise one or more laptop computers, desktop computers, rack-mounted computers, tablet computers, special purpose computers, embedded central processing units (CPUs), etc., or a combination of the noted types. The one or more networks 210 may comprise hard-wired networks, wireless networks, or a combination of wired and wireless networks that employ any or a combination of well-known network transactional protocols such as are presently employed to affect transfer of data over the well-known internet.

The secure module build center 220 may be collocated with other processing resources, such as is in the case of a data center housing multiple servers for a variety of different clients. The secure module build center 220 may comprise a firewall 221 that is coupled to a coordination server 224. The coordination server 224 may be coupled to a plurality of build servers 222.1-222.N according to the present invention. The plurality of module build servers 222.1-222.N may each comprise a secure module build application program 223.1-223.N.

The secure module build center 200 is configured to generate and distribute special purpose modules to each of the consumer computing systems 201. The modules may be employed to perform one or more special functions in any of a number of operating system environments including, but not limited to Unix derivatives (e.g., Linux, Solaris, Free BSD, Mac OS, Ubuntu) or any other operating system that employs the module concept. In one embodiment, the one or more special functions may comprise those functions associated a virtual block device module that may be employed to perform rapid and transparent system backups (i.e., snapshots) to any of a number of block devices (e.g., hard disk drives, solid state drives, network attached storage, etc.). Though the embodiment noted is directed towards a virtual block device module, the present inventors note that the secure module build center 200 and techniques employed therein may be employed to protect module build hardware and software associated with the build of modules that may be configured to perform any function.

As noted above, from a module vendor's perspective, security of the module build center 220 is of utmost importance, and it is a feature of the present invention to preclude damage to the center 220 incurred via the one or more networks 210 in numerous ways including, but not limited to, insertion of malware (e.g., Trojan Horses, viruses), insertion of spyware, phishing, tampering with normal operation, and hacking for purposes of damage or theft. Accordingly, the secure module build center 220 may comprise a firewall 221 to prevent unauthorized access to the build servers 222.1-222.N via the one or more networks 210. The secure module build center 220 may additionally comprise mechanisms, described in more detail below, to preclude damage to the center 220 if one or more of the consumer computing systems 201 overcomes the firewall 221.

Like those of FIG. 1, each of the consumer computing systems 201 may comprise an operating system OSV.1-OSV.N, OS.X that employs the module concept, as is discussed above. The operating systems OSV.1-OSV.N, OS.X may differ only in respect to version (e.g., Linux Version X.X versus Linux Version Y.Y, etc.) and/or they may differ with respect to type (e.g., Linux versus Solaris, etc.). Similarly, each of the consumer computing systems 201 may also differ with respect to configuration (e.g., hardware and software installed). For purposes of teaching the present invention, assume that the consumer computing system 201 running operating system OS.X additionally comprises malicious application program 202, which is configured to overcome (i.e., punch through) the firewall 221 and tamper with one or more of the build servers 222.1-222.N to damage the one or more build servers 222.1-222.N, to obtain proprietary software, or both.

Like the present day module build center 120, to build a module that is compatible with a given consumer computing system 201, the secure module build center 220 must have access to both configuration data (e.g., operating system type and version, kernel configuration and modifications, compiler type and configuration, etc.) and makefile data corresponding to the given consumer computing system 201. In one embodiment, the configuration data and makefile data for each of the consumer computing systems 201 may be transmitted separately to the module build center 220. In another embodiment, the configuration data and makefile data are be consolidated into single configuration files 203.1-203.N, 203.X for transmission over the one or more networks 210 to the center 220. As the configuration files 203.1-203.N, 203.X pass through the firewall 221, they received by the coordination server 224 for queuing and subsequent distribution to a corresponding one of the plurality of build servers 222.1 which comprises a secure module build application program 223.1-223.N that is compatible with the received configuration data, namely, a secure module build application 223.1-223.N having a compiler and linker of specific type and version that will build a module to correctly execute on the consumer computing system 201 associated with the received configuration data.

The coordination server 224 may comprise agent control 224.1, a queue controller 224.2, and a build distributor 224.3. In operation, the agent control 224.1 may perform functions to distribute an agent utility program (not shown) to the one or more consumer computing systems 201. The agent utility program, which is described in more detail below, executes on each of the consumer computing systems 201, and monitors and transmits the configuration files 203.1-203.N, 203.X to the secure module build center 220 at times when a new version the module is required, such as when system configuration changes, and/or when operating system changes (i.e., version, type, or both).

The queue controller 224.2 may receive the configuration files 203.1-203.N, 203.X, and place them into a plurality of queues (not shown) that each correspond each of the plurality of build servers 122.1-122.N. In one embodiment, the queue controller 224.2 may be configured to receive, queue, distribute 1024 configuration files 203.1-203.N, 203.X simultaneously and to receive, queue, and distribute a commensurate number of corresponding built modules back to the consumer computing systems 201. However, the present inventors note that system architecture according to the present invention is scalable, and that larger numbers of simultaneous operations within the queue controller 224.2 may be easily accommodated by increasing the number of ports for communication with the consumer computing systems 201.

The build distributor 224.3 is configured to access the plurality of queues, to distribute the configuration files 203.1-203.N, 203.X to corresponding ones of the plurality of build servers 222.1-222.N, to receive the corresponding built modules, and to place the corresponding built modules into corresponding queues for distribution back to the consumer computing systems 201.

For purposes of clearly teaching the present invention, consider that configuration file 203.X also includes valid operating system commands in the makefile data that are not generally employed to build a module, but rather are malicious commands directed towards damage to its corresponding build server 222.1-222.N or theft of software (e.g., source code) stored thereon. Accordingly, as is depicted in the diagram, the configuration files 203.1-203.N, 203.X are received over the one or more networks 210 by the firewall 221, they are appropriately queued in the coordination server 224, and are subsequently distributed to corresponding ones of the plurality of module build servers 222.1-222.N, as is discussed above. However, in contrast to the present day system 100, the secure module build system 200 according to the present invention employs novel techniques and mechanisms with each of the build servers 222.1-222.N to detect malicious configuration files and to preclude damage to the resources within the secure module build center 220 and/or theft of proprietary software.

Operationally, each of the secure module build applications 223.1-223.N may comprise a wrapper that appears to compile and link a module according to the makefile data provided within each of the configuration files 203.1-203.N, 203.X. However, when the makefile data is processed within the secure module build application 223.1-223.N, the commands within the makefile data are first scanned against a whitelist of valid and known compilation commands (e.g., valid GCC commands). Only those commands that are in the whitelist are extracted and placed in a log file (i.e., a secure makefile for creation of the module). The log file is then transferred to a protected and secure area of memory on the server 222.1-222.N. In a Unix-derivative embodiment, the protected and secure area of memory is accessed by the secure module build application 223.1-223.N via execution of the chroot command. The proprietary resources (e.g., source code, system data, etc.) are stored only in the protected and secure area of memory, along with a compiler and linker of type and version compatible with the consumer computing system 201 associated with the configuration file 203.1-203.N, 203.X

The log file is then executed within the protected and secure area to compile object files from proprietary source code stored therein, and the object files are transferred back to unprotected memory. In unprotected memory, the wrapper then executes rename operations for each of the object files according to the whitelist compilation commands in the log file.

Next, the secure module build application 223.1-223.N (i.e., the wrapper) scans the makefile data against a whitelist of valid and known commands employed to link the object files (e.g. valid LD commands). Only the whitelist commands are executed to link together the object files, resulting in a built module for the corresponding consumer computing system 201.

For each of non-malicious configuration files 203.1-203.N, their corresponding module build servers 222.1-122.N execute the secure module build applications 221.1-221.N and generate corresponding built modules by employing whitelist operating system commands within their makefile data to compile and link modules that will correctly execute on their corresponding consumer computing systems 201.

For malicious configuration file 203.X, the secure module build application 223.1-223.N scans its makefile data and extracts and logs only valid commands to make the module, thus precluding execution of any malicious commands that are directed to access proprietary software/data, and/or to damage the secure module build server 222.1-222.N. In one embodiment, when the log file associated with the malicious configuration file 203.X comprises insufficient whitelist commands to compile and link a module, the secure module build server 222.1-222.N may generate an alternative module for distribution to the corresponding computing system 201. When executed on the corresponding consumer computing system, the alternative module may provide indications on its display that malicious commands have been detected and no module was built. In another embodiment, the secure module build server 222.1-222.N may forego distribution altogether and instruct the coordination server to block all further module build requests from the corresponding consumer computing system 201.

In one embodiment, the secure module build servers 222.1-222.N may be configured to simultaneously build up to 512 modules of a specific operating system type and version, however, the present inventors note that system architecture according to the present invention is scalable, and that larger numbers of simultaneous build operations may be easily accommodated via load balancing by provisioning additional secure module build servers 222.1-222.N.

Advantageously, the system 200 according to the present invention protects proprietary assets (both hardware and software) within the secure module build center 220 from malicious configuration files 203.X that may pass through the firewall 221.

The secure module build center 220 according to the present invention is configured to perform the functions and operations as discussed above. The secure module build center 220 may comprise logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the secure module build center 220 may be shared with other circuits, microcode, etc., that are employed to perform other functions and/or operations within secure module build center 220. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The secure module build center 220 according to the present invention may also comprise a computer program product encoded in at least one non-transitory computer usable medium for use with a computing device, for performing one or more of the functions and operations disclosed herein. The computer program product may be disposed as computer usable program code (i.e., instructions) within a non-transitory medium such as, but not limited to, a hard disk or non-volatile memory. The computer usable program code may be embodied in the medium, and may specify one or more elements of the present invention via the program code.

Figure 3:
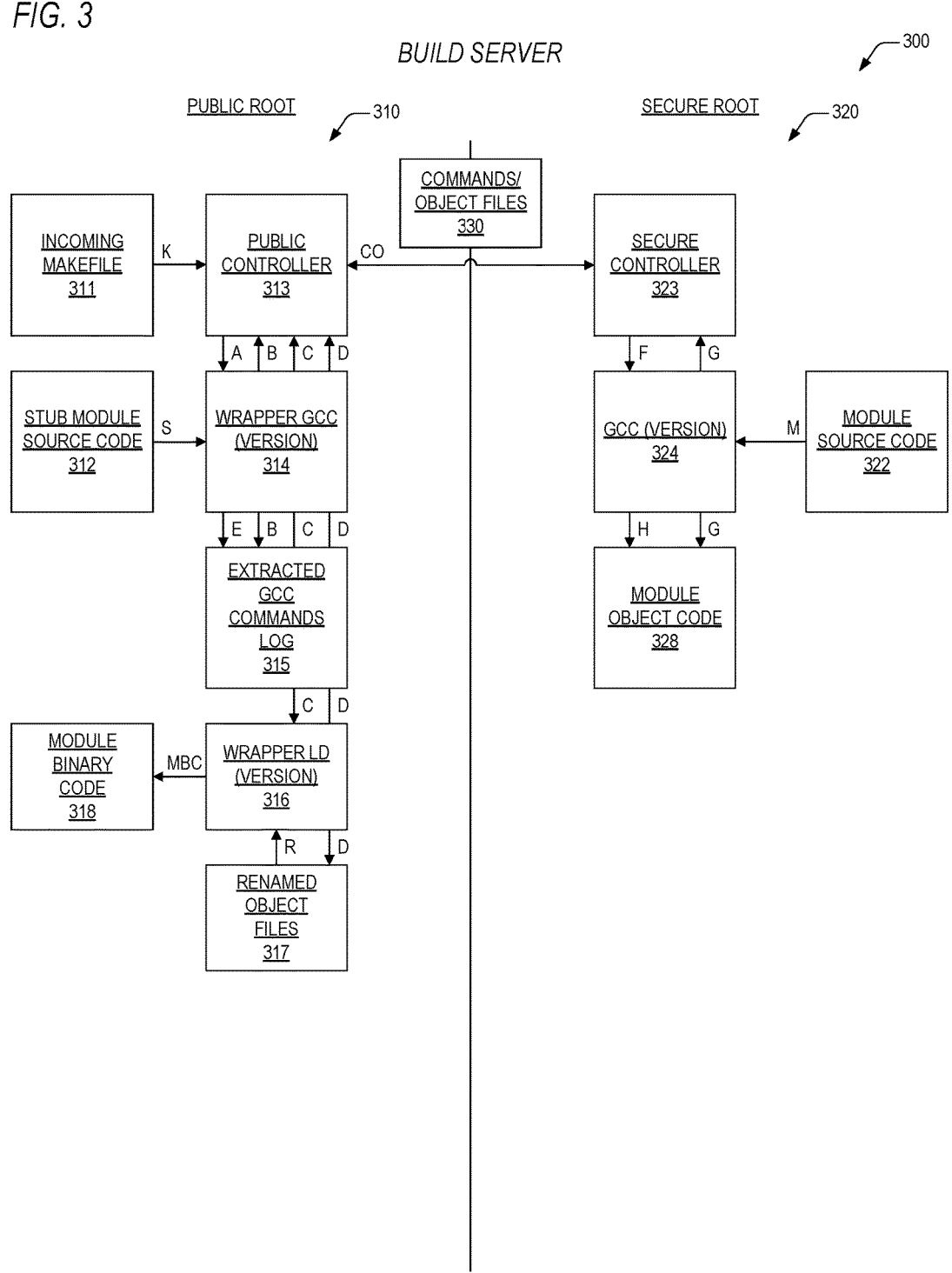
FIG. 3 is a block diagram featuring details of an exemplary build server according to the present invention.

Now turning to FIG. 3, a block diagram featuring details of an exemplary build server 300 according to the present invention. The build server 300 may comprise a public root 310, which comprises an unprotected area of memory, and a secure root 320, which comprises a protected and secure area of memory. The public root 310 may comprise a public controller 313 that receives makefile data 311 from a coordination server (not shown). The public controller 313 is coupled to a wrapper secure module build compiler 314 via bus A. Though, as noted above, the wrapper secure module build compiler 314 may comport with a number of different module-based operating systems, for purposes of clearly teaching the present invention, the wrapper secure module build compiler 314 will henceforth be referred to as wrapper GCC 314. The wrapper GCC 313 is coupled to stub module source code 312 via bus S and to a log file 315 via bus E. The log file 315 is coupled to the public controller via bus B. The public controller 313 is also coupled to a wrapper secure module build linker 316 via bus C. As noted above, the wrapper secure module build linker 315 may comport with a number of different module-based operating systems, for purposes of clearly teaching the present invention, the wrapper secure module build linker 315 will henceforth be referred to as wrapper LD 315. The public controller 313 is further coupled to renamed object files 316 via bus D, and the renamed object files 316 are coupled to the wrapper LD 316 via bus R. The wrapper LD 316 is coupled to module binary code 318 via bus MBC.

The secure root 320 may comprise a secure controller 323 that is coupled to the public controller 313 via bus CO. The secure controller 323 is coupled to a module build compiler 324, henceforth referred to as GCC 324, via bus F. GCC 324 is coupled to proprietary source code 322 via bus M. The proprietary source code 322 is compiled by GCC 324 to create module object code 328, which is provided via bus H. The module object code 328 is coupled to the secure controller 323 via bus G.

In operation, the coordination server transmits makefile data 311 to the secure build server 300 based upon configuration data received for a corresponding consumer computing system (not shown). The makefile data 311 is provided to the public controller 313 over bus B. Within the public root 310, the public controller 315 provides the makefile 311 to the GCC wrapper 314 over bus A. The GCC wrapper 314 then executes, extracting, in order, only whitelist GCC commands from the makefile 311, and creates a whitelist set of GCC commands to build a module in the log file 315 via bus E. In another embodiment, the wrapper GCC 314 extracts commands both whitelist GCC and whitelist LD commands to build the module in the log file 315. The log file 315 is provided to the public controller 313 over bus B. The public controller 313 then provides the log file 315 to the secure controller 323 in the secure root 320 over bus CO.

In the event of malicious makefile data 311, where the extracted whitelist compilation commands are insufficient to compile, the wrapper GCC 314 may access stub module source code 312 via bus S, and generate an alternative module for delivery to the malicious consumer computing system, as described above.

The secure controller 323 then provides the log file 315 to GCC 324, which executes using the whitelist compilation commands within the log file 315, accessing proprietary source code files within the module source code 322 via bus M, as directed by the whitelist compilation commands, and compiling the proprietary source code files into named object files. The named object files are provided to module object code 328 via bus H, and the secure controller 323 access the module object files via bus G. The named object files are provided by the secure controller 323 to the public controller 313 via bus CO in binary form. Advantageously, the module source code 322 is not exposed, thus precluding tamper or theft.

The public controller 313 then provides the named object files to the wrapper GCC 314. The wrapper GCC 314 accesses the whitelist compilation commands from the log 314 and, rather than executing the whitelist compilation commands, performs rename operations to generate renamed object files 317 in accordance with the commands, which are provided to the public controller 313, and the public controller 313 provides the renamed object files 317 via bus D.

In one embodiment, the public controller 313 then provides the the makefile data 311 to the wrapper LD 316, which extracts and executes whitelist LD commands contained therein to link the renamed object files 317 according to the whitelist LD commands. In another embodiment, the public controller 313 directs the wrapper LD 316 to execute the whitelist LD commands in the log file 315 to link the renamed object files 317 according to the whitelist LD commands. Thus, module binary code 318 is generated via secure compilation and linking, and is provided via bus MBC for return to the coordination server.

Figure 4:
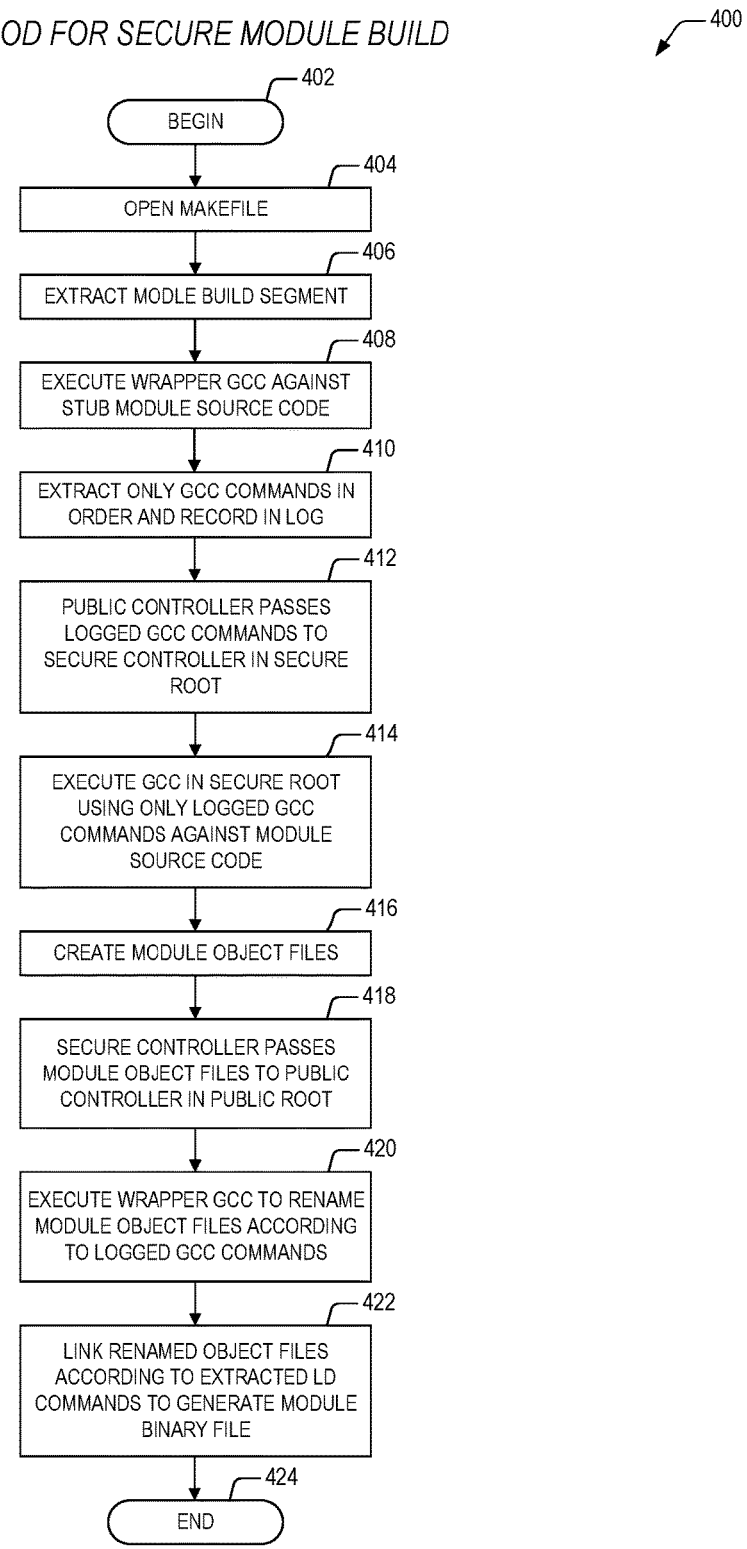
FIG. 4 is a flow diagram showing a method according to the present invention for securely building a module.

Referring now to FIG. 4, a flow diagram 400 is presented showing a method according to the present invention for securely building a module. Flow at block 402 where a secure module build server according to the present invention receives makefile data from a coordination server. Flow then proceeds to block 404.

At block 404, the makefile is opened. Flow then proceeds to block 406.

At block 406, a segment within the makefile for building a module is extracted. Flow then proceeds to block 408.

At block 408, a wrapper GCC executes the makefile module build segment against stub module source code. Flow then proceeds to block 410.

At block 410, the wrapper GCC extracts in order only whitelist GCC commands for the module and records these commands in a log file. In another embodiment, the wrapper GCC extracts in order only whitelist GCC commands and whitelist LD commands for the module and records these commands in a log file. If insufficient whitelist commands are extracted, then the wrapper GCC generates an alternative module from the stub module source code for return to a corresponding consumer computing system. Flow then proceeds to block 412.

At block 412, a public controller in a public root of the secure module build server passes the logged GCC commands to a secure controller in a secure root of the secure module build server. Flow then proceeds to block 414.

At block 414, a GCC executes the logged GCC commands against proprietary module source code to compile the module source code into named object files. Flow then proceeds to block 416.

At block 416, the named object files are stored in the secure root. Flow then proceeds to block 418.

At block 418 the secure controller passes the named module object files back to the public controller in the public root. Flow then proceeds to block 420.

At block 420, the wrapper GCC again executes logged GCC commands to rename the named object files into renamed object files. Flow then proceeds to block 422.

At block 422, the renamed object files are linked together according to extracted whitelist LD commands, resulting in a generated module binary file, for return to the corresponding consumer computing system. Flow then proceeds to block 424.

At block 424, the method completes.

Figure 5:
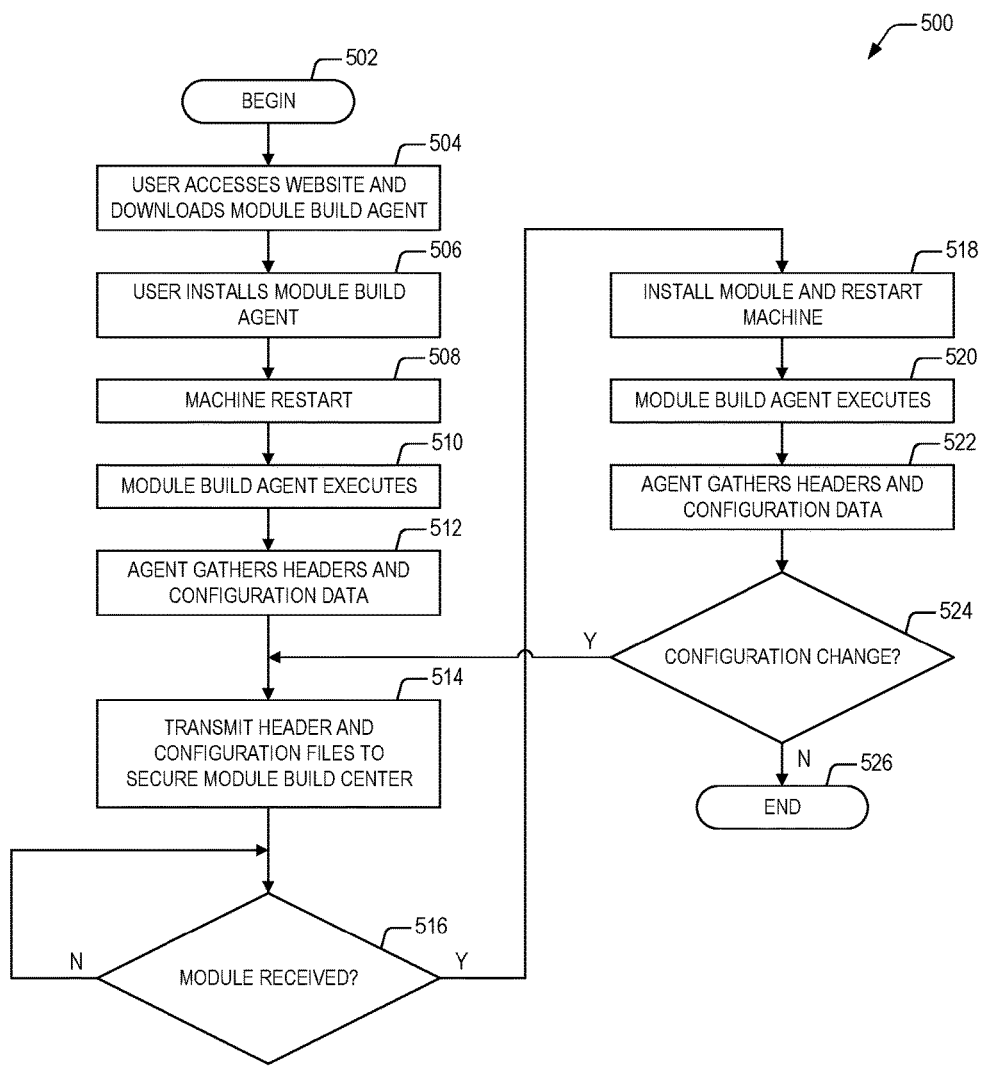
FIG. 5 is a flow diagram illustrating an agent control method according to the present invention.

Turning now to FIG. 5, a flow diagram 500 is presented illustrating an agent control method according to the present invention. As described above with reference to the coordination server 224 of FIG. 2, the agent control 224.1 may perform functions to distribute an agent utility program to the one or more consumer computing systems 201. The agent utility program executes on each of the consumer computing systems 201, and monitors and transmits the configuration files 203.1-203.N, 203.X to the secure module build center 220 at times when a new version the module is required, such as when system configuration changes, and/or when operating system changes (i.e., version, type, or both).

Flow begins at block 502, where a user of a consumer computing system desires to have a module built for execution on their system. Flow then proceeds to block 504.

At block 504, the user may employ a web browser on the consumer computing system to access a web site in order to download the agent utility program, or module build agent. A web server for the web site may be collocated in the module build center. By entering identification data, the user is allowed to download the module build agent. Flow then proceeds to block 506.

At block 506, the user installs the downloaded module build agent on their consumer computing system. Flow then proceeds to block 508.

At block 508, the user restarts their consumer computing system. The installed module build agent is configured to execute automatically upon restart and transparently to other applications that the user may be executing. Flow then proceeds to block 510.

At block 510, the module build agent executes automatically as a result of the restart. Flow then proceeds to block 512.

At block 512, the agent gathers configuration data and makefile data (i.e., header files) for the consumer computing system. Flow then proceeds to block 514.

At block 514, the configuration and header files are transmitted to the secure module build center, as described above. Flow then proceeds to decision block 516.

At decision block 516, an evaluation by the agent is made to determine if a built module has been received at the consumer computing system from the secure module build center. If it has not been received, then flow proceeds to decision block 516. That is, the agent waits until the built module is received to perform further functions. If the module has been received, then flow proceeds to block 518.

At block 518, the agent automatically installs the module and calls for a restart of the system by the user. The user subsequently restarts the system, this time loading the built module with the kernel, and flow proceeds to block 520.

At block 520, the module agent executes and flow proceeds to block 522.

At block 522, the agent retrieves configuration data and header files for the consumer computing system. Flow then proceeds to decision block 524.

At decision block 524, the agent compares the retrieved configuration data and header files with those previously retrieved. If configuration of the system has changed, then flow proceeds to block 514. If the header files and configuration data is unchanged, then flow proceeds to block 526.

At block 526, the method completes.

The method of FIG. 5 continues to run the agent each time the system is restarted to determine if configuration has changed and to automatically build and install a module that comports with the changed configuration. As one skilled in the art will appreciate, operating systems of the Unix-derivative (e.g., Linux) ships changes frequently, and the apparatus and method according to the present invention advantageously does not require the user notify the module build center each time configuration changes.

Another advantage of the present invention is that when kernel modifications are made, the system according to the present invention only updates and distributes a module, as opposed to some systems (e.g., VMWARE®) that must rebuild and distribute an entire operating system to perform be compatible with the kernel modifications.

A further advantage is that the present invention enables a vendor to build and ship a proprietary driver to a consumer without requiring use of a shim and without exposing proprietary source code.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for securely building a module for a consumer computing system, the apparatus comprising:
   a computer program product encoded in at least one non-transitory computer usable medium that, when executed, functions as:
   a coordination server, configured to receive configuration and makefile data associated with the consumer computing system, and configured to place said data in a queue, and configured to provide the module to the consumer computing system; and
   a build server, coupled to said coordination server and corresponding to said configuration data, configured to receive said data from said queue, and configured to build the module based on commands within said makefile data, wherein said build server extracts whitelist commands from said makefile data within a public root of said build server, executes said whitelist commands within a secure root of said build server to generate named object files from proprietary source files, transfers said named object files to said public root, renames said object files into renamed object files according to said whitelist commands, and links said renamed object files to generate the module.

2. The apparatus as recited in claim 1, wherein the consumer computing system executes a Unix-based operating system, and wherein the module is loaded at run time with a kernel of said Unix-based operating system.

3. The apparatus as recited in claim 1, wherein execution of said whitelist commands within said secure root precludes execution of malicious commands that are within said makefile data, thereby improving security of said build server.

4. The apparatus as recited in claim 1, wherein said proprietary source files are stored exclusively in said secure root.

5. The apparatus as recited in claim 1, wherein execution of said whitelist commands within said secure root transforms said proprietary source code files into named object files, and wherein said named object files are in binary form, and wherein said binary form does not reveal instructions in said proprietary source files.

6. The apparatus as recited in claim 1, wherein said secure root comprises a compiler that is compatible with the consumer computing system.

7. The apparatus as recited in claim 6, wherein said public root comprises a wrapper that appears to perform operations according to said compiler, but rather extracts said whitelist commands from said makefile data.

8. The apparatus as recited in claim 7, wherein said wrapper generates an alternative module when said whitelist commands are insufficient to build the module.

9. An apparatus for securely building a module for a consumer computing system, the apparatus comprising:
   a computer program product encoded in at least one non-transitory computer usable medium that, when executed, functions as:
   a coordination server, configured to receive configuration and makefile data associated with the consumer computing system, and configured to place said data in a queue, and configured to provide the module to the consumer computing system; and
   a build server, coupled to said coordination server and corresponding to said configuration data, configured to receive said data from said queue, and configured to build the module based on commands within said makefile data, said build server comprising:
     a secure root, configured to execute whitelist commands to generate named object files from proprietary source files; and
     a public root, configured to extract said whitelist commands from said makefile data, to transfer said whitelist commands to said secure root, to receive said named object files, to rename said object files into renamed object files according to said whitelist commands, and to links said renamed object files to generate the module.

10. The apparatus as recited in claim 9, wherein the consumer computing system executes a Unix-based operating system, and wherein the module is loaded at run time with a kernel of said Unix-based operating system.

11. The apparatus as recited in claim 9, wherein execution of said whitelist commands within said secure root precludes execution of malicious commands that are within said makefile data, thereby improving security of said build server.

12. The apparatus as recited in claim 9, wherein said proprietary source files are stored exclusively in said secure root.

13. The apparatus as recited in claim 9, wherein execution of said whitelist commands within said secure root transforms said proprietary source code files into named object files, and wherein said named object files are in binary form, and wherein said binary form does not reveal instructions in said proprietary source files.

14. The apparatus as recited in claim 9, wherein said secure root comprises a compiler that is compatible with the consumer computing system.

15. The apparatus as recited in claim 14, wherein said public root comprises a wrapper that appears to perform operations according to said compiler, but rather extracts said whitelist commands from said makefile data.

16. The apparatus as recited in claim 15, wherein said wrapper generates an alternative module when said whitelist commands are insufficient to build the module.

17. A method for securely building a module for a consumer computing system, the method comprising:
    via a coordination server, receiving configuration and makefile data associated with the consumer computing system, and placing the data in a queue, and returning the module to the consumer computing system; and
    via a build server, receiving the data from the queue, and building the module based on commands within the makefile data, said building comprising:
        extracting whitelist commands from the makefile data within a public root of the build server;
        executing the whitelist commands within a secure root of the build server to generate named object files from proprietary source files;
        transferring the named object files to the public root;
        renaming the object files into renamed object files according to the whitelist commands; and
        linking the renamed object files to generate the module.

18. The method as recited in claim 17, wherein the consumer computing system executes a Unix-based operating system, and wherein the module is loaded at run time with a kernel of the Unix-based operating system.

19. The method as recited in claim 17, wherein said executing of the whitelist commands within the secure root precludes execution of malicious commands that are within the makefile data, thereby improving security of the build server.

20. The method as recited in claim 17, wherein the proprietary source files are stored exclusively in the secure root.

21. The method as recited in claim 17, wherein said executing of the whitelist commands in the secure root comprises transforming the proprietary source code files into named object files, and wherein the named object files are in binary form, and wherein the binary form does not reveal instructions in the proprietary source files.

22. The method as recited in claim 17, wherein the secure root comprises a compiler that is compatible with the consumer computing system.

23. The method as recited in claim 22, wherein the public root comprises a wrapper that appears to perform operations according to the compiler, but rather extracts the whitelist commands from the makefile data.

24. The method as recited in claim 23, wherein the wrapper generates an alternative module when the whitelist commands are insufficient to build the module.

* * * * *